United States Patent Office 3,486,148
Patented Dec. 23, 1969

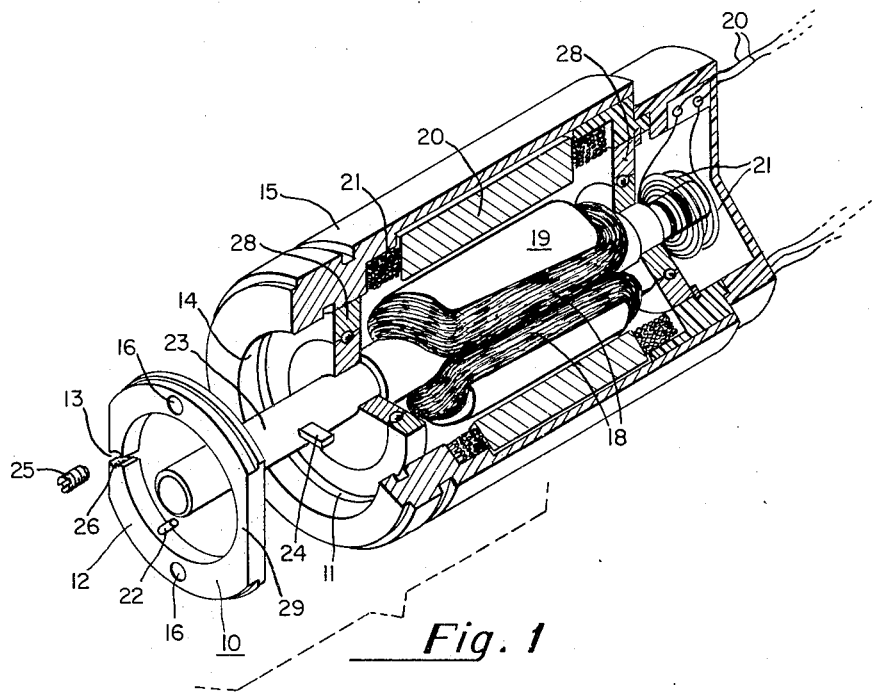
Fig. 1
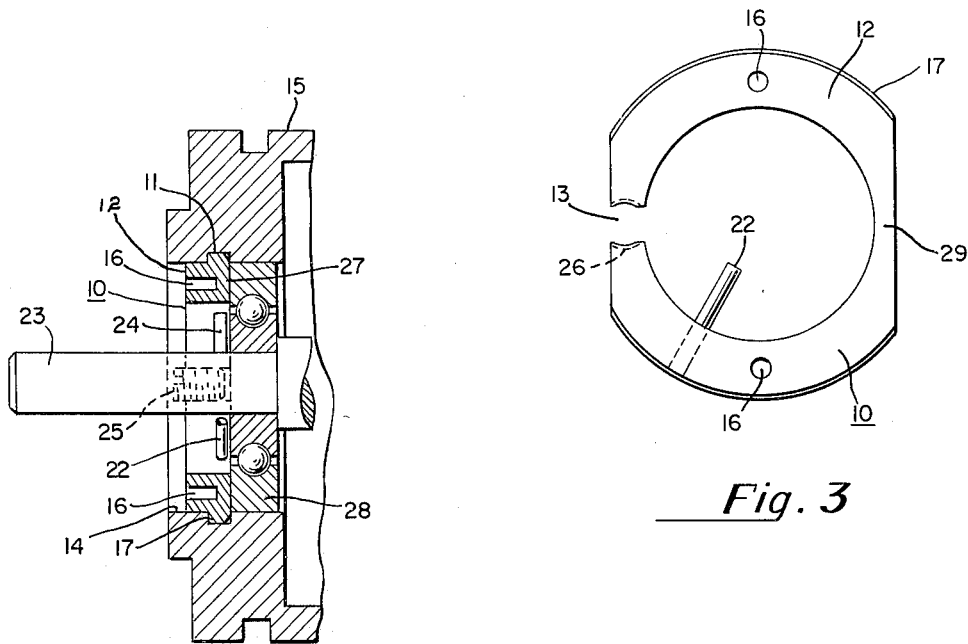
Fig. 2
Fig. 3

3,486,148
STOP AND RETAINER FOR A SYNCHRO DEVICE
Eric K. Christensen, Boothwyn, Pa., assignor to Harowe Servo Controls, Inc., West Chester, Pa., a corporation of Pennsylvania
Filed Mar. 22, 1968, Ser. No. 715,212
Int. Cl. H01f 7/14
U.S. Cl. 335—272                                     7 Claims

ABSTRACT OF THE DISCLOSURE

A combination shaft stop and bearing retaining assembly for a synchro device of limited rotation which includes a split ring resiliently disposed within a retaining groove in an end bore of the housing assembly for the synchro device which both retains the bearing for the rotor of the device and provides a stop with infinite adjustment points for rotation of the rotor by means of an inwardly disposed projection cooperating with an outwardly projecting stop on the shaft of the rotor, together with a tapered screw and thread assembly in the region of the slot for expanding the split ring into locking engagement with the walls of the annular groove to set the stop for the rotor at a predetermined annular relationship in respect to the stator.

Background of invention

This invention relates to improvements in the stop assembly and bearing retaining means for a brushless synchro device of limited rotation.

Synchronous devices or synchros are AC motorlike devices used for transmission, reception or conversion of angular data. Some of their uses are for remote transmission of shaft position, data transmission, computing systems, etc. and produce a mechanical indication of a shaft position as a function of an electrical input or an electrical output as a function of shaft position.

Electro-magnetically, synchros consist of a wound rotor and a wound stator concentrically aligned to give adjustable magnetic coupling between the two wound members in accordance with varying shaft rotation.

Synchros, as such, have been known for a number of years and may be found in many forms including torque synchros, control synchros, resolvers and induction potentiometers. These classes of synchros may be further divided into those which are fully rotating or those of the brushless and limited rotation type, the latter being the type to which the present invention is applied.

Synchros of the limited rotation type generally employ electrical connecting means between the external input or output to the rotor and the rotor windings which will not permit the rotor to be completely free to rotate in an unlimited manner. Thus, by necessity, synchros of this type must employ stops in conjunction with the rotor which will limit the angular rotation of the rotor to within predetermined limits and which, as well, must be able to withstand a torque of relatively substantial magnitude.

In one popular form of brushless synchro of limited rotation, a retaining ring is resiliently disposed within an annular groove in the end bore of the housing assembly which also houses a bearing assembly for one end of the rotor. Intermediate the rotor bearing and the retaining ring there is disposed a circular ring-like stop plate which includes a projection extending radially inwardly of the ring which is designed to engage a similar projection axially aligned therewith extending outwardly from the shaft of the rotor.

In setting a synchro employing this stop assembly to the proper electrical position, the rotor and stator must be properly electrically aligned and then the stop plate rotated to its proper position. Once this proper position has been established, the stop plate and retaining ring are cemented in place one to another and to the housing assembly to maintain this predetermined electrical position.

The aforedescribed stop assembly and those of this general nature which have heretofore been in conventional use, present certain problems. One such problem is the excess assembly time and difficulty in assembly necessitated by having to align the stop ring and thereafter cement the stop ring to the retaining ring and housing assembly. Also, the cement used will often pass into the bearing assembly adjacent the stop plate and foul or bind the synchro bearings.

Once such an assembly has been set, the cement will be subject to heat and temperature extremes which may cause the cement to fail and thus allow the preset position to be lost. Further, the cement does not present the upper torque limitations of the stop member which are desirable, especially after the cement has been exposed to time, temperature or heat. Lastly, once the stop assembly has been thus cemented together, repair and disassembly are thereafter made extremely difficult.

Summary and objects of invention

Accordingly, it is an object of the present invention to provide a stop assembly of a size which will fit within the dimensions of a standard electrical device of limited rotation which assembly replaces the use of cement and in place thereof provides a mechanical lock for the stop assembly which may be quickly, easily and positively locked, subsequently unlocked, disassembled and reset as desired.

It is also an object of the present invention to provide a stop assembly of essentially unitary construction which replaces the two-piece stop assembly conventionally used and which may be used within the same housing assembly as the conventional stops.

It is a further object of the present invention to provide a stop assembly which provides both the stop for the electrical device and, as well, a bearing retainer for the bearing supporting one end of the rotating member of the electrical device.

The new assembly of the present invention carries out the foregoing objetcs by means of a contoured split ring which is so proportioned as to be disposed in the annular groove which the conventional retaining ring formally employed. The split ring is, as well, of sufficient thickness to provide a retainer for the bearing assembly on one end of the rotor. The split ring, as well, includes a projection thereon which extends radially inwardly of the ring a sufficient distance to engage the stop pin on the synchro rotor.

After the stator and rotor are disposed in the proper electrical position, the new stop ring, according to the present invention, is placed in a predetermined angular relationship in respect to the rotor and is locked in place against the walls of the annular groove by means of a tapered thread and screw assembly in the region of the split which expands the ring into engagement with the annular groove.

These and further objects of the present invention will become apparent in view of the drawings and description of the invention which follows:

Description of drawings

FIG. 1 is an isometric view partially exploded and partially in section showing the stop and retaining assembly of the present invention in combination with synchro device;

FIG. 2 is a side view in section of one end of a synchro device with the stop and retaining ring of the present invention in place; and FIG. 3 is an end view of the combination stop and retaining ring of the present invention.

Description of invention

In FIG. 1 of the drawings there is shown in cut-away and partially exploded form, one of the more popular brushless synchro devices of limited travel with the new and novel combination stop assembly 10 withdrawn from its normal seated position within a retaining groove 11 which normally secures a conventional retaining ring as earlier discussed.

The stop assembly 10, as may be seen in FIGS. 1 and 3, includes a split ring 12 which employs an area 29 of substantially reduced cross-section on one side of the ring. This reduced cross-sectional area operates in conjunction with a slot 13 on the opposite side therefrom to permit the assembly, which has a large outside diameter than bore 14 of the housing assembly 15 to be flexed to a reduced diameter to enable the ring to pass into the bore 14.

A pair of oppositely disposed holes 16 in the ring will facilitate the use of a proper tool to compress the ring to the required diameter for its insertion into the bore.

Once the ring has been inserted into the bore, as shown in FIG. 2, the resiliency of the ring will expand an outer flange 17 of the ring into the annular groove 11.

The engagement of the flange 17 with the walls of the annular grooves 11 is, however, not tight enough but what the ring 10 can still be revolved within the annular groove for adjustment of the stop as later described although generally locked in place at this time.

Once the ring is in place, as shown in FIG. 2, the thickness of the ring 10 is so designed that one face 27 of the ring provides a retainer for the bearing 28 which supports one end of the rotor 19 within the housing assembly 15.

In brushless synchro devices of limited rotation of the type shown, the windings 18 of the rotor 19 are electrically connected to the input or output leads 20 of the device by such elements as a pair of wound hair springs 21, which make electrical contact with the windings through appropriate leads passing through the shaft of the rotor. Due to the presence of the hair springs 21, the rotor cannot be permitted to rotate beyond certain predetermined limits or the hair springs would be destroyed. Thus, a stop device is required. However, the required stop position for the rotor to establish the proper electrical position of the rotor 19 in respect to the stator 20 and its associated windings 21, varies from unit to unit and can best be established after the unit has been assembled and is placed under simulated operating conditions.

The ring of the present invention provides the required stop and adjustment once it is in place within the bore of the assembly by means of a stop member 22 associated with the ring 12 which, in the example shown, is a round pin which is pressed into a corresponding hole in the inner circumference of the ring and extends inwardly of the inner circumference of the ring a predetermined distance short of the diameter of the shaft 23 of the rotor.

When the ring 12 is in place, as shown in FIG. 2, the stop member 22 will engage a corresponding shaft stop member 24 secured within the shaft 23. The shaft stop member 24 extends radially from the shaft 23 a distance less than the inside diameter of the ring 10. In this manner, the rotation of the shaft and rotor of the synchro is limited to substantially 330°.

Once the proper electrical position of the rotor 19 with respect to the stator 20 has been established under simulated operating conditions, the rotor shaft may then be held secure and the stop assembly 10 revolved in the annular groove 11 until the stop 22 has reached the proper angular relationship in respect to the shaft stop 24.

At this time, the ring 10 is then secured againnst further movement in the annular groove by means of a screw 25 which is threaded into a tapped hole 26 in the region of the slot 13 of the ring. The hole 26 is a tapered tap and when the screw 25 is threaded into the hole, it will expand the ring 10 and force the outer circumference of the ring into firm engagement with the walls of the annular groove 11 and the bore of the housing assembly 15.

Subsequent readjustment of the electrical position of the synchro or disassembly thereof may be easily accomplished by loosening or removing the screw 25 and realigning the ring 10 or removing it entirely from the bore of the assembly.

In one specific embodiment of the present invention, the ring 10 was used in a synchro which had a bore of .460 inch. The outside diameter of the retaining ring was .470 inch and the inside diameter .305 inch. The flange 11 of the ring was .005 inch high and was made .016 inch wide. The overall thickness of the ring was .070 inch.

The reduced cross-sectional area 12 of the ring was made .020 inch and the slot 13 .030 inch. The threaded holes 26 were tapped to accommodate #0–80 screw.

The foregoing description of the present invention was made in respect to the synchro device shown in the drawings. Nevertheless, the present invention is not limited to synchro devices alone but can find use in combination with other electrical devices of limited rotation.

What is claimed is:

1. In a synchro device of limited rotation which employs a rotor and shaft assembly mounted within a housing assembly by suitable bearing means and which operates in conjunction with a stator assembly mounted within the housing assembly to provide variable magnetic coupling as a function of relative shaft position, and a stop assembly to limit the relative angular position between the rotor and the stator within predetermined limits, the improvements in said stop assembly comprising:

an annular groove disposed circumferentially within a bore at one end of the housing assembly, a split ring disposed within said annular groove in sliding engagement therewith, a first projection extending inwardly from the inner circumference of said ring, a second projection extending outwardly from said rotor shaft and aligned with and in interfering engagement with said first projection providing a stop for said rotor, and means for expanding said split ring against the walls of the annular groove to securely lock the ring in respect to the housing assembly whereby the desired stop position may be adjusted by sliding the ring within the annular groove until the desired angular relationship of the rotor in respect to the stator is obtained in the stopped position whereupon the stop may be locked upon expansion of the split ring.

2. The device of claim 1 in which said split ring further includes a relieved cross-sectional area opposite said slot to further aid in the flexure of said ring during assembly of said device.

3. The device of claim 1 in which said means for expanding said split ring includes a tapered and tapped hole across said slot and a screw member which, upon being threaded into said tapered and tapped hole will expand said ring.

4. The device of claim 1 in which said first projection extending inwardly of said ring is an elongated pin press fitted into the periphery of said ring.

5. The device of claim 1 in which the outer circumference of the split ring includes a first portion of diameter greater than said bore and of width suitable to pass within said annular groove and a second portion thereof of substantially the same diameter as said bore which passes beyond said annular groove inwardly of the bore and in engagement with said bearing means to act as a retainer therefor.

6. In a synchro device employing a stator mounted within a housing assembly and a rotor mounted concentric of the stator within the housing by means of bearings on either end of the rotor shaft disposed within corresponding bores at either end of the housing assembly in which device the bearing at one end of the assembly is retained by and the rotation of the rotor shaft limited by a stop assembly which includes a retaining ring mithin an annular groove within the bore, a stop member disposed intermediate the bearing and retaining ring which is cemented to the housing and retaining ring and stop projection on the shaft of the rotor which engages the stop member, the improvements in said stop assembly comprising a replacement collar stop for both the retaining ring and stop member including:

a ring of a diameter slightly larger than the bore through the housing assembly and having a narrow slot cut in the periphery thereof to permit the ring to be contracted to a diameter which will permit it to pass within said bore and expand within said annular groove.

a stop member secured to said ring in axial alignment with the stop on said shaft and projecting inwardly of said ring a distance sufficient to interfere with the stop on said shaft, and means in the region of said slot to expand said ring in contact with the walls of the annular groove to lock the collar stop in respect to the housing assembly after the stop has been set in the desired relationship with respect to the rotor and stator.

7. A combination shaft stop and bearing retaining assembly for a synchro device of limited rotation having a rotor mounted within a housing by bearing means disposed in a bore within at least one end of the housing comprising:

an annular groove within said bore adjacent said bearing means disposed therein, a stop member secured to said shaft longitudinally thereon in substantial alignment with said annular groove and projecting radially therefrom a predetermined distance, a stop assembly disposed within said annular groove, said stop assembly defining a ring-like member of outside diameter in excess of the diameter of said bore and having an inside diameter less than the diameter of said bore but greater than that to which said stop member projects, said ring-like member further including a second stop member on the inner circumference thereof projecting inwardly a distance to provide interfering engagement with said first stop member, said stop assembly having a cross-sectional slot therein to permit flexure thereof to enable the ring to pass within said bore, and means in the region of said slot to expand said ring into engagement with the walls of said annular groove once the stop ring has been preset to thus provide a combination stop for the rotor and retainer for the bearing means.

References Cited

UNITED STATES PATENTS

| | | | |
|---|---|---|---|
| 2,289,227 | 7/1942 | Walker | 310—36 XR |
| 3,158,796 | 11/1964 | Musgrave | 335—272 XR |
| 3,221,191 | 11/1965 | Cuches et al. | 310—36 |

GEORGE HARRIS, Primary Examiner

U.S. Cl. X.R.

310—36, 166